United States Patent [19]

Philip

[11] 4,084,342
[45] Apr. 18, 1978

[54] FISHING DEVICE

[76] Inventor: Charles R. Philip, Box 116, Haugen, Wis. 54841

[21] Appl. No.: 705,947

[22] Filed: Jul. 16, 1976

[51] Int. Cl.² ............................................. A01K 87/00
[52] U.S. Cl. .................................................. 43/19.2
[58] Field of Search ............................. 43/19.2, 18 R

[56] References Cited

U.S. PATENT DOCUMENTS

| | | | |
|---|---|---|---|
| 2,632,273 | 3/1953 | Fletcher | 43/18 R |
| 3,835,570 | 9/1974 | Philip | 43/19.2 |
| 3,955,303 | 5/1976 | Outlaw | 43/19.2 |

Primary Examiner—Louis G. Mancene
Assistant Examiner—Robert P. Swiatek
Attorney, Agent, or Firm—Wegner, Stellman, McCord, Wiles & Wood

[57] ABSTRACT

A fishing device having a handle, an elongate rod secured to and extending from the handle, a line having one end secured to the handle and a free end hanging from the rod, guide members secured to the handle for supporting an intermediate portion of the line spaced from the rod, a motor, and an eccentric arm rotatively driven by the motor to engage and deflect the intermediate portion of the line spaced from the rod so that the free end of the line is jigged. The guide members are adjustably secured to the handle so that the attitude or angle of the intermediate portion of the line relative to the eccentric arm is adjustable to vary the line deflection. The rod is secured to the handle so that it may be telescoped relative to the handle to change its operative length. A weight is adjustably disposed on the rod so that the center of gravity of the rod may be redistributed.

13 Claims, 4 Drawing Figures

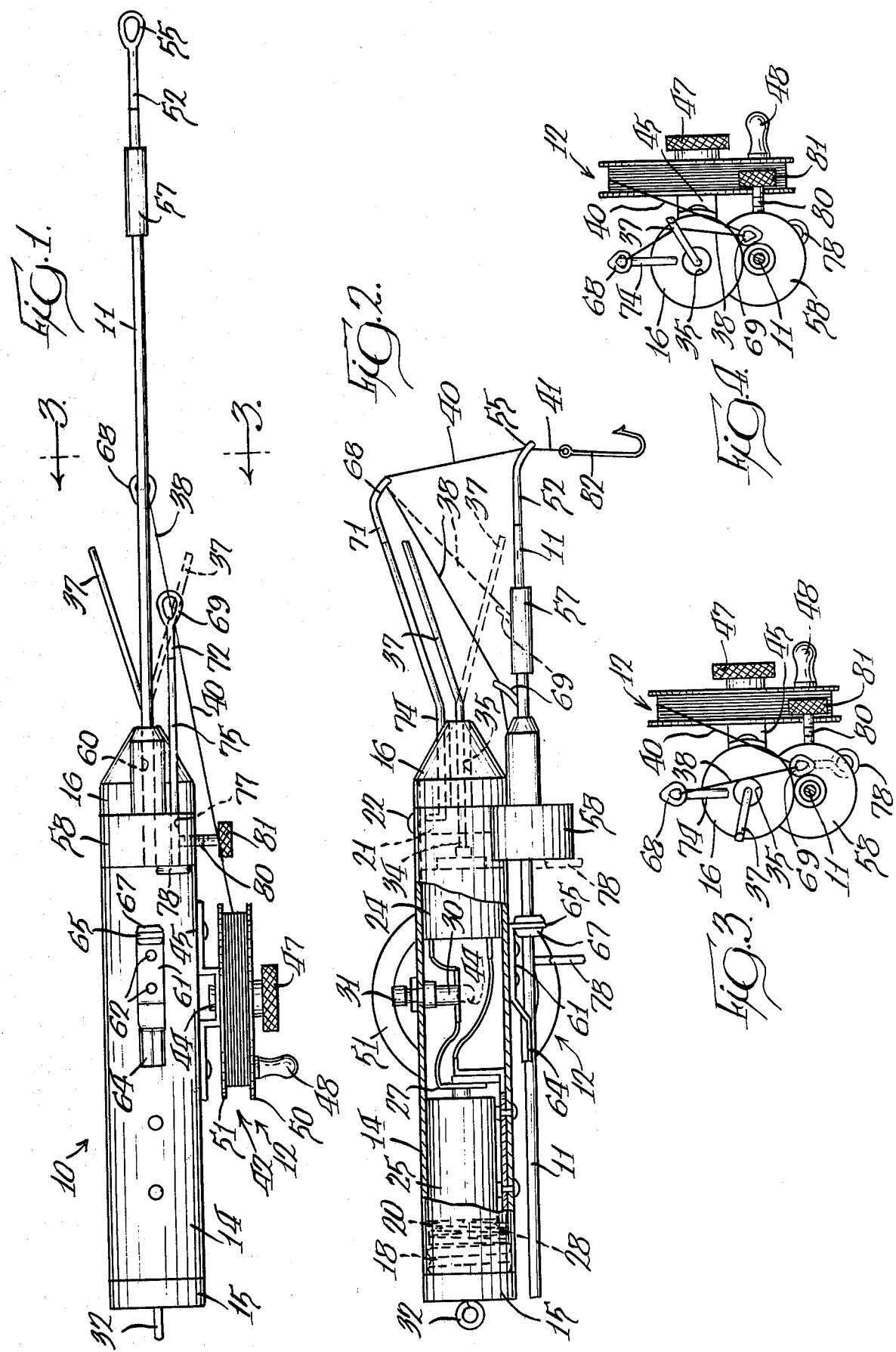

FISHING DEVICE

BACKGROUND OF THE INVENTION

The present invention relates to a motorized fishing device and, more particularly, to a jigging rod for rapidly moving a lure or baited hook at the end of a line hanging in water.

Jigging is a rapid movement of a lure or bait in water in order to arouse the interest of fish nearby and attract them to the hook. Jigging is generally employed when fishing through a hole in ice, when it is not practical to troll or cast and retrieve. In the past, many devices have been constructed which replace manual manipulation with a mechanized device. One such device is disclosed in my U.S. Pat. No. 3,835,570 entitled "Motorized Fishing Device" issued Sept. 17, 1974. Therein, a fishing line is rapidly vibrated and lightly jigged up and down by repeatedly striking the line with an eccentric striker arm rotatively driven by an electric motor powered by a battery.

It has been found that the rate and type of vibrating motion of the line, and the ultimate hook or bait jigging action, is controlled by a number of factors. These factors include the speed of the motor, the stiffness of the rod, the weight of the line, the weight of the hook or lure, and the distance the line is deflected from its normal path by the striker arm.

The speed of the motor is itself dependent on the condition of the batteries which power it. As the batteries weaken, the motor slows and, thus, the rate at which bobbing or other motion is imparted to the lure slows.

The distance the line is deflected by the striker arm can be altered by changing the relative relationship between the striker arm and the line. If the line is oriented so that the arm causes greater deflection, the lure will move up and down to a greater extent.

The rod itself generally has a tendency to vibrate along with and as a result of the vibrating line which it supports. The vibratory motion of the line is thus additionally dependent on two simultaneous actions, the rod vibration and the striker arm deflection, which are themselves interdependent. The rate at which the rod vibrates is dependent on the speed of the striker arm, the extent of the deflection, and the stiffness of the rod. It is evident, however, that the vibratory motion of the rod and the effects thereupon by the vibration of the line generated by the striker arm can be altered by changing the length of the rod or redistributing its weight or center of gravity. By adding weight to the free end of the rod or shortening the length of the rod, the extent of vibration of the rod can be substantially lessened. The weight of the line, as well as the configuration and weight of the lure, bait, and hook, will also have substantial effects on the resulting vibratory movement of the lure.

When jigging, it is important that the lure have an oscillatory or dancing action with only a slight up and down movement. Violent jumping action of the lure is not usually a desirable action for attracting fish, and will often frighten fish away. When a jigging device is properly tuned, the lure vibrates slightly up and down but, more importantly, it oscillates back and forth, the type of movement which generally attracts fish. Having the lure vibrate to an extent and at a rate which attracts fish, rather than repels them, is very important. When fishing, jumping action is undesirable, but oscillation or dancing with only slight up and down movement is desirable.

SUMMARY OF THE INVENTION

The present invention provides a fishing device including a handle, rod, reel and motor-driven jigger which can be adjusted to varying conditions to provide a desirable bobbing or oscillation of the lure at all times. The device is totally integrated to provide a complete fishing tool, one which may quickly and easily be utilized whenever and wherever desired. The handle supports a forwardly extending rod and a reel for storing line. The line, in turn, is supported by appropriately positioned line guides. An eccentric striker arm is rotatively driven by a battery-powered motor housed within the handle so that it repeatedly contacts and deflects the line to impart desired action to the lure.

In accordance with the invention, a portion of the line is stretched between two line guides, one of which is adjustable to move the inclination of the line relative to the striker arm so that the extent of deflection of the line may easily be modified. Both the line guides are carried at the ends of rigid shafts which are secured to a handle. At least one of the shafts may be telescoped relative to the handle to alter the position of the line guide which it carries.

Since the length of the rod has a substantial effect on the vibration of the lure because of the resiliency of the rod, it may be adjustably telescoped between an extended position and a retracted position. By varying the length of the rod, its operative weight and stiffness may be varied to achieve desirable results. A damper or weight is placed on the rod to reduce the vibration of the rod and lessen the effect of the rod on the vibrating action of the line. This damper may be adjustably movable along the rod.

By providing these adjustments, the fishing device may be finely tuned to obtain desired "lure action" which attracts fish regardless of the strength of the batteries or the type and weight of the line and lure being utilized. In addition, the length of the line extending from the rod may be changed without substantial interference with the striker arm or the line guides.

BRIEF DESCRIPTION OF THE DRAWINGS

FIG. 1 is a plan view of a motorized jigging device in an extended position and embodying the principles of the present invention;

FIG. 2 is a side elevational view of the device shown in FIG. 1 with the rod in a retracted position, the handle being partially broken away to show its interior, and two positions (one in phantom) of the intermediate portion of the line between two guide members being shown;

FIG. 3 is a cross-sectional view taken along line 3—3 of FIG. 1; and

FIG. 4 is a cross-sectional view similar to FIG. 3, with the striker arm angularly displaced from the position shown in FIG. 3.

DESCRIPTION OF THE PREFERRED EMBODIMENT

A motorized jigging device constructed according to the present invention includes a handle structure, generally designated 10, a thin, tapered, elongate rod 11, and a storage reel, generally designated 12. Both the rod 11 and the reel 12 are operatively carried by the handle structure 10.

The handle structure 10 generally includes a tubular casing 14, a rear end cap 15, and a tapered front end cap 16. The rear end cap 15 has a threaded forward portion 18 to engage internal threads formed on the inner surface 20 of the casing 14 and secure the end cap 15 thereto. The front end cap 16 has a reduced rearward portion 21 which is inserted into the casing 14 and is secured therein by a screw 22 passinng through the casing 14 and into the end cap 16. Mounted forwardly within the casing 14 is an electric motor 24 of conventional design which is driven by a power supply, such as the dry cell battery 25, which is carried rearwardly therewithin. The battery 25 is urged into contact with a forward battery terminal 27 by a coiled spring 28 which acts as the other battery terminal. A switch 30 is connected along and between the battery terminal 27 and the motor 24 so that the motor 24 can be selectively activated by depressing an external switch button 31. An eyelet screw 32 is threaded into the rear end cap 15 to which a strap or the like may be attached.

The motor 24 rotates a drive shaft or striker arm 34 which extends forwardly from the handle structure 10 through a central opening 35 in the end cap 16. The striker arm 34 has an eccentric portion 37 which moves through an arcuate path when rotated to engage and deflect an intermediate portion 38 of the line 40 as shown in FIGS. 3 and 4 so as to cause movement of the free end 41 of the line 40.

The reel 12 has a central hub portion 42 journaled on a laterally directed stub shaft 44 carried by a bracket 45 which, in turn, is secured to one side of the casing 14. A friction washer (not shown) is disposed on the stub shaft 44 on either side of the reel 12. Disposed between the bracket 45 and the adjacent friction washer is a spring washer (not shown) which normally urges the reel 12 outwardly from the bracket 42. A knurled nut 47 is threaded onto the end of the stub shaft 44 to adjustably secure the reel 12 thereon. The further the nut 47 is tightened down onto the reel 12, the greater the force required to rotate the reel 12. An outwardly extending knob 48 is provided to permit facile operation of the reel 12. The circumference of the reel 12 has a pair of spaced flanges 50 and 51 to form a concave outer surface so that the line 40 may be wound onto the reel 12 without difficulty or having it slip from the reel 12. The reel 12 may be manipulated in a conventional manner to vary the length of the line 40 extending from the rod 11.

The rod 11 is generally formed from plastic, metal or wood so that it is resiliently flexible. The rod 11 is rearwardly secured to the handle structure 10 and has a forward end 52 extending therefrom which is diametrically smaller than its rearward end 54 because of the taper. The rod 11 has a line guide, such as a ferrule or eyelet 55 at its forward end 52. A weighted damper 57, whose function is described below, is impaled on an intermediate portion of the rod 11.

A seat structure 58 is secured to or integrally formed with the handle structure 10 and has a longitudinally tapered sleeve affording an aperture or opening 60 through which the rod 11 extends. The aperture 60 is diametrically smaller at its forward end than at its rearward end. The rod 11 may be telescoped to a fully extended position as shown in FIG. 1 by pulling the rod forwardly until the taper of the rod corresponds with the taper of the aperture 60 so that the rod 11 wedges within the aperture 60 and further extension of the rod is prevented. The rod 11 may be moved to a retracted position as shown in FIG. 2 by pushing the forward end 52 of the rod 11 rearwardly toward the handle structure 10. When the damper 57 abuts the seat structure 58, further retraction of the rod 11 is prevented.

A camming bracket 61 is secured to the outer surface of the casing by rivets 62. The bracket 61 includes a concave camming surface 64 which is generally parallel to the rod 11 and an upright lateral portion 65 having an aperture (not numbered) lined with a rubber grommet 67. The concavity of the camming surface 64 restricts lateral movement of the rod 11. The top portion of the aperture acts as an upward abutment against which the camming surface 64 resiliently urges the rod 11. Frictional engagement of the rod 11 with the grommet 67 permits the rod 11 to be securely retained on the handle structure 10 at almost any desired position between a fully extended position and a fully retracted position.

The weighted damper 57 is positioned near the forward end 52 of the rod 11 intermediate that end and the handle structure 10 to increase the weight of the rod 11 and act as a stabilizer to substantially lessen the frequency and extent of vibration of the rod 11 as the device is operated. The damper 57 may be friction-fit on the rod 11 by suitable means so that it is movable along the length of the rod 11 to adjustably redistribute the weight of the rod 11 and vary the rate at which the rod 11 tends to vibrate.

The intermediate portion 38 of the line 40 is supported at a position spaced from the rod 11 by line guides, such as ferrules or eyelets 68 and 69, carried at the forward ends 71 and 72 of a pair of elongate shafts 74 and 75, respectively, which are rearwardly secured to the handle structure 10. The shafts 74 and 75 extend from the handle structure 10 toward the forward end of the rod 11 and generally parallel therewith. By mounting the line guides 68 and 69 to the handle structure 10 rather than the rod 11, they are not subject to the movements of the resilient rod 11.

The shaft 74 is anchored in the front end cap 16. The shaft 74 may be bent slightly away from the rod 11 so that it does not interfere with the arcuate movement of the eccentric arm 37. The eyelet or guide member 68 is carried by the shaft 74 so tht it is spaced from the handle structure 10 and the rod 11.

The shaft 75 extends through a narrow sleeve affording an aperture or opening 77 formed in the seat structure 58 and carries the eyelet 69 at its forward end 72 remote from the handle structure 10. The shaft 75 may be telescoped through the aperture 77 forwardly to an extended position as shown in FIG. 1, or rearwardly to a retracted position as shown in FIG. 2 in order to selectively adjust the position of the guide member or eyelet 69 so as to alter the attitude of the line extension or portion 38 and the angle of attack thereon by the eccentric arm 37. As the shaft 75 is slid out to full extension, the line portion 38 is moved so that the line is then deflected by the forward end of the eccentric arm 37 to impart greater movement to the free end 41 of the line. The rear end 78 of the shaft 75 is curled to prevent the shaft 75 from being moved forwardly beyond a predetermined fully extended position. A set screw 80 with a knurled knob 81 is threaded into a bore extending through the seat 58 to engage and fixedly secure the shaft 75 at any number of desired positions.

The line 40 has one end secured to the reel 12 and is wound thereabout. The line 40 extends from the reel 12 and is supported by and passes, in turn, through the eyelet 69, the eyelet 68 and the eyelet 55 at the forward end 52 of the rod 11. The free end 41 of the line 40 hanging from the free end of the rod 11 carries a hook 82 or the like.

The attitude of the intermediate portion 38 of the line can thus be seen to be independent of the length of the rod 11 and also substantially independent of the vibration of the rod 11.

As can be seen in FIGS. 3 and 4, the eccentric arm 37 rotates in an area between the two shafts 74 and 75 so as to intermittently engage the intermediate portion 38 of the line extending between the eyelets 68 and 69. As long as the switch button 31 is depressed, the motor 24 is energized and operates to rotate the eccentric arm 37 so that it repeatedly engages and disengages the intermediate line portion 38 stretched between the eyelets 68 and 69. As seen in FIG. 3, the eccentric arm 37 is angularly disposed in a position of contact with the line 38, whereas in FIG. 4, the eccentric arm 37 is angularly disposed in a position where the stretch of line 38 is deflected from a straight line extending between the eyelets 68 and 69. The deflection of the line as illustrated in FIG. 4 serves to pull the end 41 with the hook 82 upwardly. Then, when the eccentric arm 37 disengages the line, the hook 82 drops again to its original position. When the motor 24 is operated, the eccentric arm 37 repeatedly brushes the line 38 and provides a very fine movement of the hook 82 rapidly upwardly and downwardly. At the same time, the hook 82 also usually assumes a twisting and dancing movement back and forth in an arcuate path.

The shaft 75 can be adjusted to alter the attitude of the intermediate portion 38 of the line relative to the rotating eccentric arm 37 (as shown in dotted outline in FIG. 2). As a result, the amount of deflection and therefore the extent of the bobbing action of the line may be modified. In addition, the length and weight distribution of the rod 11 may be modified to selectively control the amount and rate of vibration of the free end 52 of the rod 11 so that the free end 41 of the line may be jigged as desired. The ability to adjust the rate and extent of jigging permits a fisherman to compensate for the condition of the battery and for the varying weight of the line 40 becaue of the type of line, hook, weight, lure, or the like, which is being employed at any given time. Generally, the jigging adjustments are made with the lure just below the surface of the water so that the dancing action of the lure in the water can be observed by the fisherman before lowering the lure to an appropriate depth for fishing.

I claim:

1. A fishing device, comprising: a handle; an elongate rod secured to the handle and having an end portion extending forwardly therefrom; line guide members positioned longitudinally of the rod, at least one of said guide members being spaced laterally of the rod; a line secured at one end to the handle and having a free end suspended from the end portion of the rod, the line extending through the guide members to afford a line extension between an adjacent pair of guide members; a drive motor carried by the handle; an arm spaced laterally of the rod and rotatively driven by said motor, said arm having an eccentric portion which moves through an arcuate path when the motor rotates the arm, the eccentric portion being positioned to engage and deflect said line extension to cause movement of the free end of the line; and means for varying the relative positions of the arm and the line extension to vary the deflection of the line by the eccentric portion.

2. A fishing device comprising: a handle; an elongate rod secured to the handle and having an end portion extending forwardly therefrom; a line guide member positioned forwardly of the handle and laterally of the rod; a line secured at one end to the handle and having a free end suspended from the end portion of the rod, the line extending through the guide member to afford a line extension spaced from the rod and extending between the handle and the guide member; a drive motor carried by the handle; an arm spaced laterally of the rod and rotatively driven by said motor, said arm having an eccentric portion which moves through an arcuate path when the motor rotates the arm, the eccentric portion being positioned to engage and deflect said line extension to cause movement of the free end of the line; and means for varying the relative positions of the arm and the line extension to vary the deflection of the line by the eccentric portion.

3. A fishing device comprising: a handle; an elongate rod secured at one end to said handle and having a free end extending forwardly therefrom, the free end of said rod having a line guide disposed thereon; means disposed on said handle to engage said rod and selectively secure said rod at a plurality of positions between a fully extended position forwardly of the handle and a fully retracted storage position; a line having one end secured to said handle and extending through said line guide to suspend a free end of the line from said rod; guide means for supporting an intermediate portion of said line spaced from said rod; forwardly projecting mounting means on the handle to support the guide means; a drive motor carried by the handle; an arm spaced laterally of said rod and rotatively driven by said motor, said arm having an eccentric portion which moves through an arcuate path when said motor rotates said arm to engage and deflect the intermediate portion of the line spaced from said rod to cause movement of the free end of the line; and a weighted damper adjustably mounted on the rod for movement longitudinally thereof to assist in controlling vibrations of the rod imparted by the motor and rotating arm.

4. A fishing device as specified in claim 2 in which a second line guide member is positioned adjacent the handle and rearwardly of the first line guide member, and the line extends through each of the guide members to afford a line extension therebetween.

5. A fishing device as specified in claim 2 in which a second line guide member is positioned adjacent the handle and rearwardly of the first line guide member, and the line extends through each of the guide members to afford a line extension therebetween, the second line guide member being adjustably movable relative to the first line guide member to afford the means for varying the relative positions of the arm and the line extension.

6. A fishing device as specified in claim 2 in which a second line guide member is positioned adjacent the handle and rearwardly of the first line guide member, and the line extends through each of the guide members to afford a line extension therebetween, the second line guide member being adjustably mounted on the handle for movement longitudinally of the rod to afford the means for varying the relative positions of the arm and the line extension.

7. A fishing device as specified in claim 2, in which a weighted damper is mounted on said rod, said damper being adjustably movable longitudinally of said rod to control vibrations of the rod.

8. A fishing device as specified in claim 2 in which the rod has one end adjustably secured to the handle, and means are provided on the handle for engaging and selectively securing said rod at a plurality of positions between a fully extended position and a fully retracted storage position.

9. A fishing device as specified in claim 8 in which the means for engaging and selectively securing the rod includes cam means carried by the handle and positioned to resiliently deflect said one end of the rod so as to frictionally secure said rod in retracted storage position.

10. A fishing device as specified in claim 2 in which a second line guide is positioned adjacent the handle and rearwardly of the first line guide member, and the line extends through each of the guide members to afford a line extension therebetween, the second line guide member being mounted on a shaft which is adjustably secured to the handle for selectively positioning said second line guide member longitudinally of the rod to afford the means for varying the relative positions of the arm and the line extension.

11. The fishing device of claim 10 wherein said handle has a sleeve through which the shaft extends, said shaft being slidable in said sleeve to adjustably position the second guide member forwardly of the handle, the handle having means for adjustably securing said shaft in said sleeve.

12. A fishing device as specified in claim 10, in which a second shaft is secured to the handle, the second shaft having a forwardly extending free end portion on which the first line guide member is mounted.

13. A fishing device as specified in claim 12 in which the free end portion of the second shaft diverges from the axis of the rod to afford clearance for the eccentric portion of the arm.

* * * * *